United States Patent [19]
Rieger et al.

[11] Patent Number: 5,790,574
[45] Date of Patent: *Aug. 4, 1998

[54] LOW COST, HIGH AVERAGE POWER, HIGH BRIGHTNESS SOLID STATE LASER

[75] Inventors: Harry Rieger; Henry Shields, both of San Diego; Richard M. Foster, Manhattan Beach, all of Calif.

[73] Assignee: IMAR Technology Company, San Diego, Calif.

[*] Notice: The term of this patent shall not extend beyond the expiration date of Pat. No. 5,934,875.

[21] Appl. No.: 845,185

[22] Filed: Apr. 21, 1997

Related U.S. Application Data

[63] Continuation of Ser. No. 503,373, Jul. 17, 1995, abandoned, which is a continuation-in-part of Ser. No. 295,283, Aug. 24, 1994, Pat. No. 5,434,875, Ser. No. 339,755, Nov. 15, 1994, Pat. No. 5,491,707, and Ser. No. 429,589, Apr. 27, 1995, abandoned.

[51] Int. Cl.$^6$ ............................................. H01S 3/10
[52] U.S. Cl. .................. 372/25; 372/18; 372/12; 372/13; 372/22; 372/30; 372/31; 372/70
[58] Field of Search .................. 372/25, 18, 12, 372/13, 22, 31, 30, 70, 75, 69

[56] References Cited

U.S. PATENT DOCUMENTS

5,434,875 7/1995 Rieger et al. .................... 372/25

Primary Examiner—Leon Scott, Jr.
Attorney, Agent, or Firm—John R. Ross

[57] ABSTRACT

A high average power, high brightness solid state laser system. We first produce a seed laser beam with a short pulse duration. A laser amplifier amplifies the seed beam to produce an amplified pulse laser beam which is tightly focused to produce pulses with brightness levels in excess of $10^{11}$ Watts/cm$^2$. Preferred embodiments produce an amplified pulse laser beam having an average power in the range of 1 kW, an average pulse frequency of 12,000 pulses per second with pulses having brightness levels in excess of $10^{14}$ Watts/cm$^2$ at a 20 μm diameter spot which may be steered rapidly to simulate a larger spot size. Alternately, a kHz system with several (for example, seven) beams (from amplifiers arranged in parallel) can each be focused to 20 μm and clustered to create effective spot sizes of 100 to 200 μm. These beams are useful in producing X-ray sources for lithography.

34 Claims, 10 Drawing Sheets

LOW COST, HIGH AVERAGE POWER, HIGH BRIGHTNESS SOLID STATE LASER

This application is a continuation of application Ser. No. 08/503,373, filed Jul. 17, 1995, now abandoned, which invention is a Continuation-in-Part application of Ser. No. 08/295,283, filed Aug. 24, 1994, now U.S. Pat. No. 5,434,875 on Jul. 18, 1995, Ser. No. 08/339,755, filed Nov. 15, 1994 now U.S. Pat. No. 5,491,707 and Ser. No. 429,589 filed Apr. 27, 1995 now abandoned. This invention relates to laser systems and in particular to high power, high brightness solid state laser systems.

BACKGROUND OF THE INVENTION

There is a growing need for reliable, economical X-ray sources for X-ray lithography. It is known that X-ray sources can be produced by illuminating certain metals with very high brightness laser pulses. Required brightness levels are in the range of $10^{11}$ to $10^{13}$ W/cm$^2$ for projection lithography and $10^{13}$ to $10^{15}$ W/cm$^2$ for proximity lithography.

In a typical X-ray lithography setup, a semiconductor waffer coated with a photoresist and covered at a distance of about 30 to 40 microns with an x-ray absorbing mask is illuminated with a X-rays from a point X-ray source located about 20 to 50 cm from the mask. At about 20 cm the spot size may be in the range of about 100 μm and at about 50 cm the spot size is typically larger, like 300 μm. Spot sizes are chosen to minimize blurring that comes with larger sizes and interference fringes that comes with smaller spot sizes. Current X-ray lithography needs are for resolution of chip features as small as 0.13 micron.

To meet future commercial lithography needs, average laser power requirements are about 500 Watts for projection and 1000 Watts for proximity. In addition the lithography process needs call for an X-ray spot diameter of about a 100 μm to a few 100 μm. Designing a laser to meet these requirements involves solving several current problems. The first is the correction of aberrations due to thermal distortion and self focusing in the laser rod. This problem is currently being dealt with by utilizing a Stimulating Brillouin Scattering (SBS) cell to remove these aberrations. SBS cell materials perform efficiently for laser pulses of several nanoseconds or greater. For nanosecond laser pulses, the energy needed to achieve the required brightness is 10 to 30 Joules per pulse and the repetition rate needed to achieve the required power is 100 to 30 hertz. This high pulse energy design creates two additional problems. The amount of debris produced by nanosecond pulsed lasers focused on solid targets, when operated at the required brightness and power levels, is unacceptable. (Studies done by Rutherford and CREOL indicate that the debris level from metal targets is related to the pulse duration. The shorter the pulse duration the lower the debris level.) There is a research program underway to reduce debris by using solid xenon as an X-ray target, but it is at a very early stage and costs are uncertain. The final problem is the cost of the X-ray lithography system.

Pulses in the nanosecond range when focused for X-ray generation can cause gas breakdown unless the target is located in vacuum chamber. Vacuum chambers add complexity and typically require an X-ray window.

Flash lamp pumped lasers involve high maintenance costs. Maintenance costs can generally be reduced by pumping with diode lasers. Unfortunately, laser diodes required for the 10 joule per pulse 100 Hz lasers costs millions of dollars. Diode pumped solid state laser systems are superior to the currently available commercial lasers in efficiency, reliability, compactness, EMI, acoustic noise and more.

What is needed is a laser system that meets the needs of X-ray lithography to provide 1)high average power and high brightness, 2) low debris levels and 3) low capital and maintenance cost.

SUMMARY OF THE INVENTION

The present invention provides a high average power, high brightness solid state laser system. We first produce a seed laser beam with a short pulse duration. A laser amplifier amplifies the seed beam to produce an amplified pulse laser beam which is tightly focused to produce pulses with brightness levels in excess of $10^{11}$ Watts/cm$^2$. Preferred embodiments produce an amplified pulse laser beam having an average power in the range of 1 kW, an average pulse frequency of 12,000 pulses per second with pulses having brightness levels in excess of $10^{14}$ Watts/cm$^2$ at a 20 μm diameter spot which may be steered rapidly to simulate a larger spot size. Alternately, several (for example, seven) beams can each be focused to 20 μm and clustered to create effective spot sizes of 100 to 200 μm. These beams are useful in producing X-ray sources for lithography.

In one preferred embodiment, the seed beam is produced in a mode locked Nd:YAG oscillator pumped by a diode array with the frequency of the pulses being reduced by an electro-optic modulator. In a second preferred embodiment, the seed beam is Q switched and includes a Pockels cell for cavity dumping. In a third preferred embodiment, the short duration high frequency pulses for the seed beam is produced by cavity dumping of a short cavity resonator.

A preferred kW system uses a Nd:YAG seed laser to generate 150 ps pulses at a frequency of 1 kHz, the seed beam is amplified in a preamplifier and the amplified beam is split by beam splitters into seven separate beams, each of which are directed to one of seven parallel amplifiers. The output beams of the amplifiers are frequency doubled to 532 nm and each beam is focused to a 20 μm spot on a copper target and the 20 μm spots are clustered to form a larger spot of about 150 μm.

The Applicants experimental results demonstrate good X-ray production with tight focusing on copper and iron targets at focal lengths of about 5 cm of a 72 mJ/p at 532 nm beam produced by frequency doubling a 130 mJ/p 1064 nm Nd/YAG beam. These results indicate that about 10 percent x-ray conversion can be obtained at about 130 mJ/p at 532 nm. No damage to the laser crystal due to self focusing was observed at energy levels (in the crystals) of 250 mJ/p at 1064 nm.

As compared with prior art high brightness lasers, we have achieved our very high brightness by reducing the pulse duration by about 2 or 3 orders of magnitude, from a few ns to 100 ps or less and by focusing on a very small spot. Short pulse duration at low energy per pulse permits focusing the beam in a helium atmosphere at atmospheric pressure. No vacuum chamber is necessary.

DETAILED DESCRIPTION OF PREFERRED EMBODIMENTS

Figures 1, 1C:
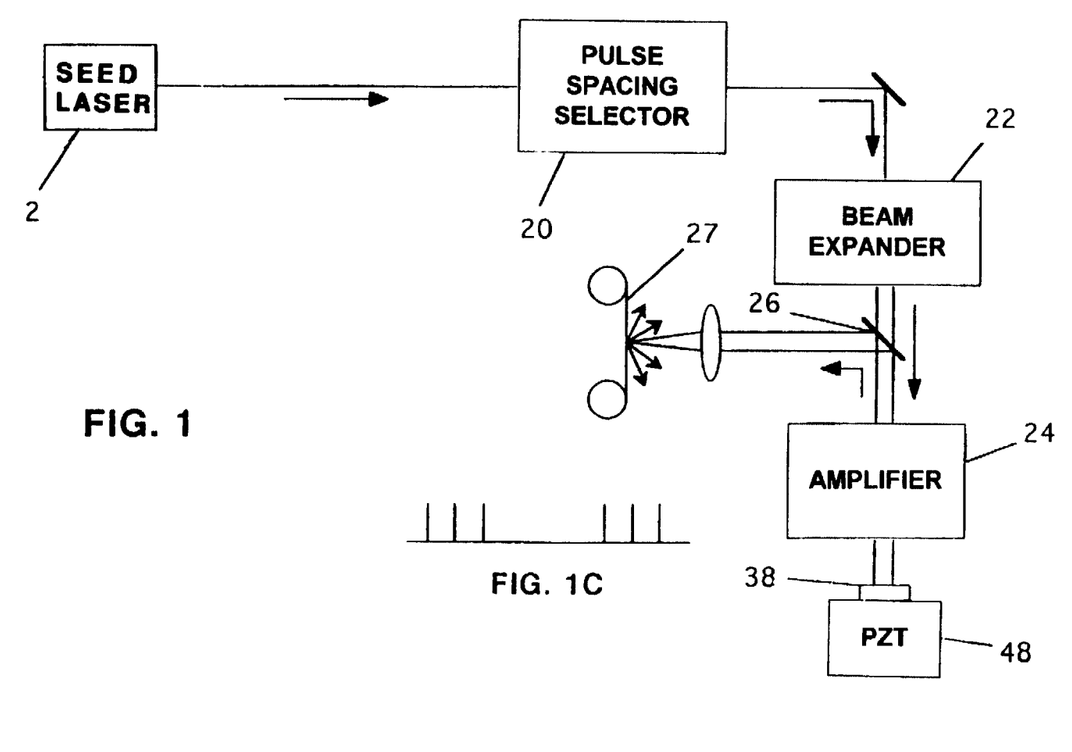
FIG. 1 is a drawing showing the principal features of a preferred embodiment of the present invention for producing high brightness pulse laser beams useful for X-ray lithography.
FIG. 1A, 1B and 1C are qualitative representations of the pulse shape at various stages of the embodiment shown in FIG. 1.
Figure 2:
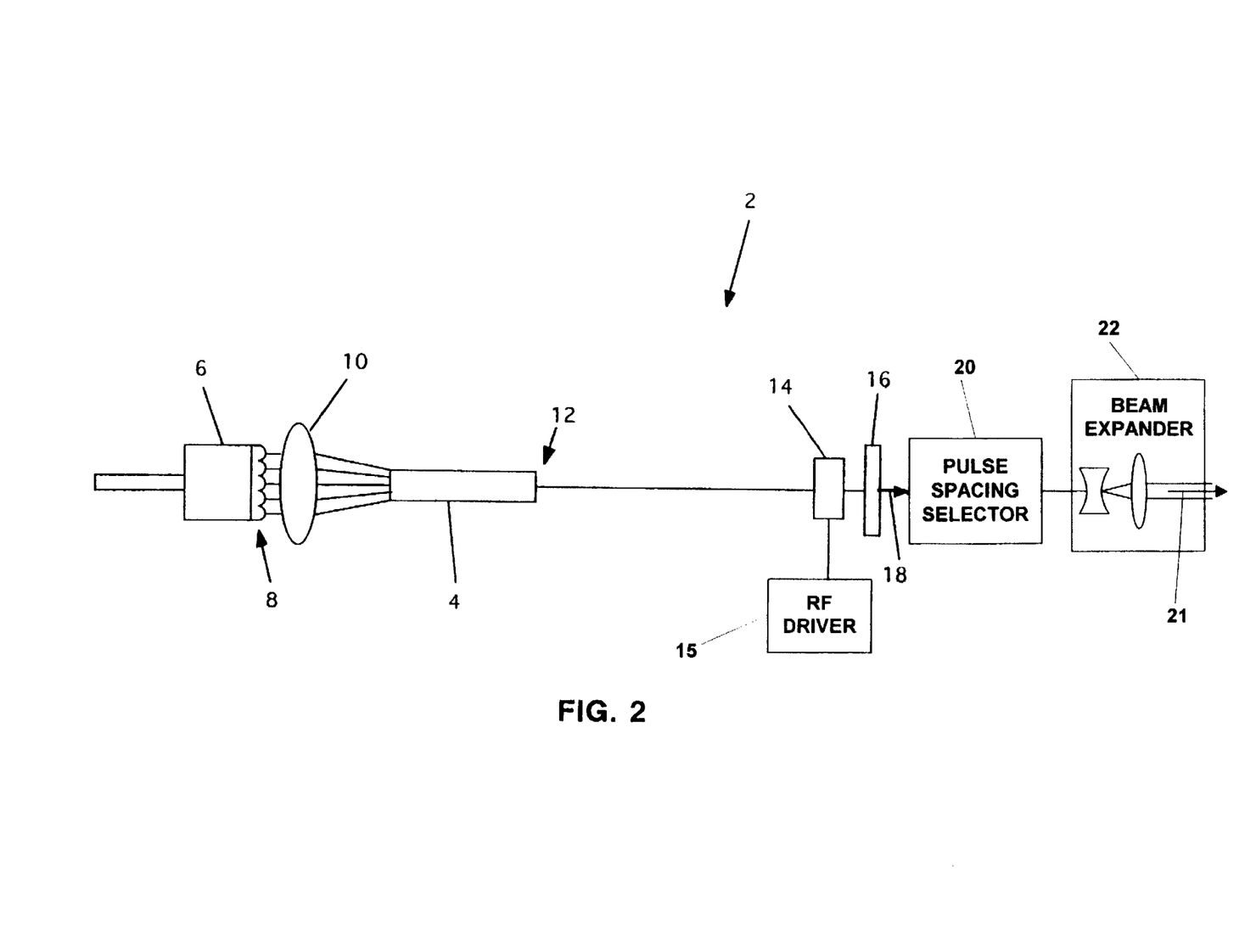
FIG. 2 is a drawing showing in greater detail a first portion of the embodiment of FIG. 1.
Figure 4:
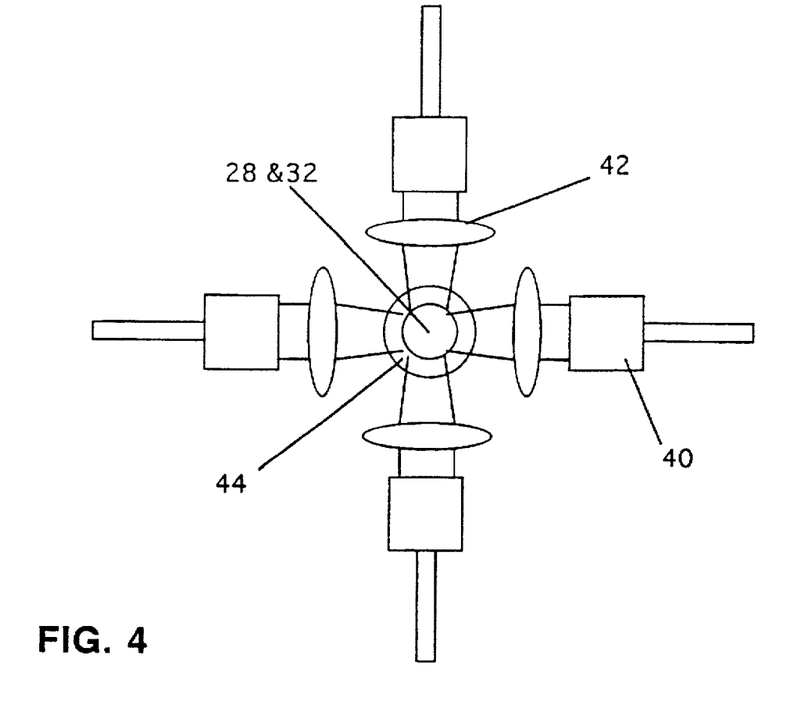
FIG. 4 is a drawing showing the amplifier pumping configuration using laser diodes for the embodiment shown in FIG. 1.
Figure 5:
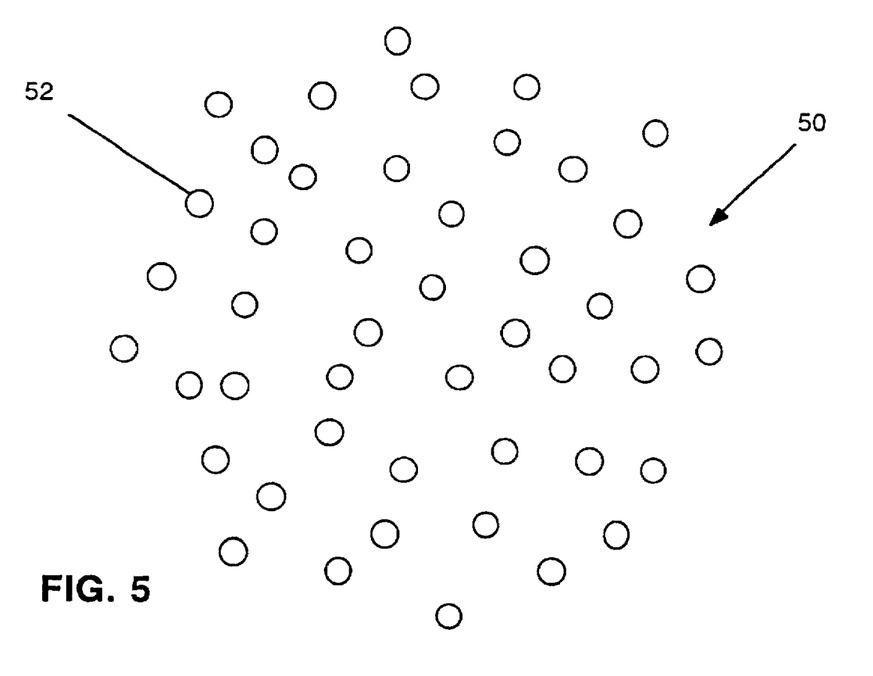
FIG. 5 is a drawing showing a cluster of tightly focused spots.

A preferred embodiment of the present invention can be described by reference to FIGS. 1, 2 and 3. As shown in FIG. 1, this embodiment consists of a mode locked Nd:YAG laser oscillator 2, a pulse spacing selector 20, a beam expander 22, a polarizing beam splitter 26, a double pass amplifier section 24 and a beam steering PZT 48 on which amplifier folding mirror 38 is mounted. The output of amplifier 24 is focused to a tiny spot on moving copper tape target 27. FIG. 2 describes the seed laser laser section of the embodiment which is for producing very short duration pulses at a very high repetition rate and FIGS. 3 and 4 describe the amplifying section for amplifying the pulses to produce a pulsed laser beam with an average power level of about 1 kW with pulses at brightness levels in the range of $10^{14}$ W/cm$^2$ on spot sizes of about 20 μm diameter. And finally, FIG. 5 shows the result of a beam steering mechanism to generate a cluster of few 20 μm spots 52 over a 500 μm diameter circular area on a metal target.

Figure 9:
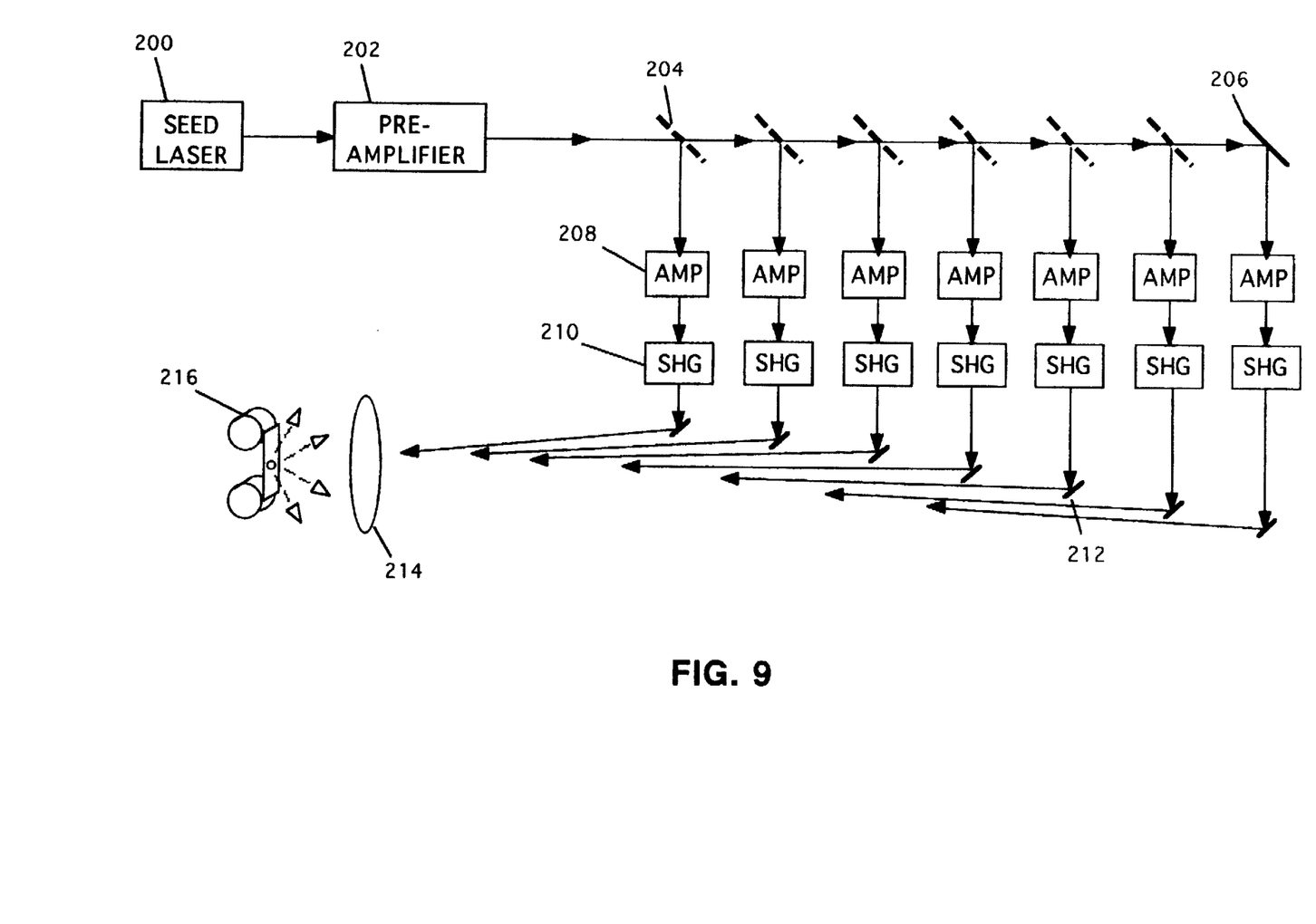
FIG. 9 is a drawing showing a schematic diagram of the second preferred amplifier system which utilizes a parallel amplifier array.

An additional preferred embodiment is shown in FIG. 9 which consists of a seed laser that generates short pulses, and a preamplifier for boosting the energy per pulse. The output beam from the preamplifier is then divided into several parallel beams to be amplified by an amplifier array. Each of the amplified beams is frequency doubled and the frequency doubled beams are focused on to a metallic target to form a cluster of the tightly focused spots to produce the size spot needed for X-ray lithography.

FIRST PREFERRED SEED LASER

Figure 1A:
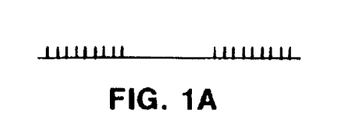

FIG. 2 is a diagram of a Nd:YAG mode locked oscillator type laser device 2. A Nd:YAG polished rod 4 (3 mm diameter and 2.5 cm long) is longitudinally pumped by a 5 bar impingement cooled laser diode array 6 (SDL part number SDL3245-J5). The diode pump array is quasi-CW and is preferably run at 20 percent duty factor (about 200 μs ON and 800 μs OFF) and 50 Watt average. The diode array wavelength is at 808 nm which corresponds to strong absorption in the Nd:YAG. The output of the pump diodes are collimated by an array of cylindrical micro-lenses 8. A fast focusing lens 10 concentrates the pump light at the back end of Nd:YAG crystal 4. The back surface of ND:YAG crystal 4 has 5 m radius of curvature (convex) and is polished and coated for maximum reflection (about 99.8 percent) at 1064 nm (the lasing wavelength of the ND:YAG laser) and for at least 85 percent transmission for 808 nm (the pump wavelength). The pump light is trapped in the laser rod via total internal reflection (similar to a fiber optics) for high pumping efficiency. The front surface 12 of the Nd:YAG rod is cut at 2 degrees to avoid parasitic oscillations and AR coated for minimal insertion loses at 1064 nm. A Brewster cut acousto-optic mode locker 14 (Brimrose Corporation of America Model FSML-38-10-BR-1064) is placed next to a partially transmitting mirror 16 (output coupler) to actively force all the longitudinal modes to be in phase each time they pass the mode locker. The RF carrier frequency (f) of the mode locker and the optical length of the laser resonator (L) must relate as follows:

$f=c/4L$ where c is the speed of light. In this embodiment, we drive mode locker 14 with a 38 MHz RF driver 15. We provide a cavity length of about 6.5 feet. Thus, a train of mode locked pulses at 76 MHz (due to the standing waves that form in the acousto-optic cell) during the ON time will be obtained. The pulse duration will be about 100 ps with an energy per pulse of about 0.6 μJ. The time interval between pulses during the 200 μs diode ON periods is about 13 ns. During each ON period we get about 15,200 of these very short pulses. Then we have a dead time of about 800 μs before the next series of 15,200 short pulses. We have 1,000 of these OFF-ON sequences each second, so the result is an average of about 15,200,000 short 100 ps pulses per second with the pulses coming in clumps of 15,200. A qualitative depiction of this pulse train is shown in FIG. 1A. The rapid series of pulses represent 15,200 pulses each with an energy of about 0.6 μJ per pulse spread over 200 μs and the space represents an 800 μs dead time.

PULSE SPACING SELECTOR

As will be explained later, we will amplify each pulse from 0.6 μJ to about 80 mJ; therefore, for an average power of 1 kW we need only 12,000 pulse per seconds. To reduce the frequency of the pulses from 15.2 million per second to 12 thousand per second, we place in the path of beam 18 exiting the seed laser a pulse spacing selector 20 as shown in FIG. 2. Pulse spacing selector 20 consists in this embodiment of an electro-optic modulator such as Model 305 supplied by ConOptics. This unit will function as a fast shutter to pass light from the beam during short intervals (each interval having a duration of about 10 ns) at a frequency of 60,000 Hz. Since the pulses are coming into the selector at 13 ns intervals, the pulse selector (synchronized with the beam) will pass a single pulse through each 10 ns window and block all other pulses. At our frequency of 60,000 Hz, we will therefore have about 12 pulses pass each 200 μs ON period. Since we have 1,000 of these ON periods each second, we will get about 12,000 pulses per second. Thus, the output of pulse spacing selector 20 is a pulse train consisting of clumps of about 12 pulses (each pulse having a duration of about 100 ps) spaced over 200 μs duration and these clumps of short pulses being spaced at intervals of 1,000 per second. This is an average of 12,000 pulses per second. To summarize, the output of pulse spacing selector is as follows:

| Pulse duration | about 100 ps |
| --- | --- |
| Energy per pulse | 0.6 µJ |
| Peak power per pulse | 6 kW |
| Average frequency | 12,000 pulses per second |
| Average power | 7.2 mW |
| Beam cross section | 0.07 cm² |

Figure 1B:
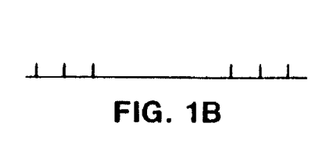

A qualitative depiction of this pulse train is shown graphically in FIG. 1B. It is essentially the same as the train shown in FIG. 1A except the frequency of the pulses during the ON period has been reduced by a factor of about 1,260.

BEAM EXPANDER

The output of the pulse spacing selector is expanded from a cross section of about 0.07 cm² to a cross section of about 0.6 cm² with a 3:1 beam expander 22 as shown in FIG. 2. Beam expander 22 consist of an appropriate combination of lenses or any of several commercially available beam expanders chosen for the 1064 nm Nd:YAG beam. The output of beam expander 22 is directed to amplifier 24 as shown in FIG. 1.

AMPLIFIER

Elements of amplifier 24 for this preferred embodiment is shown if FIG. 1. Two-pass amplification is shown in FIG. 3 and our preferred pumping configuration is shown in FIG. 4. The amplifier must boost the seed beam energy to the mJ/pulse level.

Figure 3:
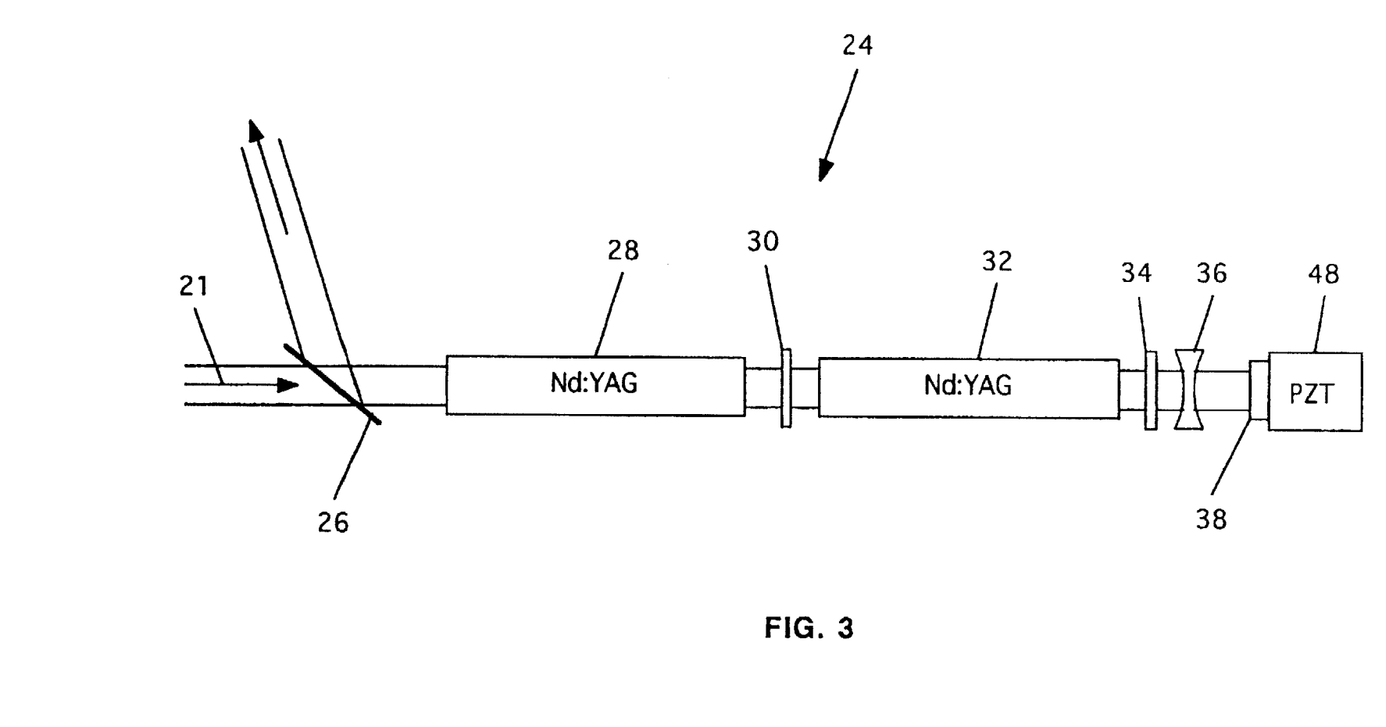
FIG. 3 Is a drawing showing in greater detail a second portion of the embodiment shown in FIG. 1.

FIG. 3 shows the principal features of the amplifier other than the amplifier pumping equipment. As shown in FIG. 3, the linearly polarized beam 21 from beam expander passes through a thin film polarizing beam splitter 26 and into a first Nd:YAG amplifier rod 28 then through a one half wavelength rotator 30 (to cancel thermally induced bi-refringence) then through a second Nd:YAG amplifier rod 32 then through quarter wave plate 34 (for shifting the polarization of the outgoing beam by 90 degrees) and corrector lens 36 (for correcting the thermal lensing in the Nd rods) and is reflected off high reflectivity (HR) mirror 38. The beam passes back through the elements of amplifier 24 for two pass amplification and reflected off polarizing beam splitter 26 from which the beam is focused and directed to a metal target 27 as shown in FIG. 1. The amplifier pumping equipment is shown in FIG. 4. This equipment includes 64 modules of 50 Watt per module (nominal) laser diode arrays 40 for a total of about 3 kW average power operating at 808 nm wavelength, 20 percent duty factor (200 µs ON and 800 µs OFF). In this embodiment 16 sets are arranged (4 shown in the circumferential direction and 4 in the linear direction, not shown) as indicated in FIG. 4. The output of the diode lasers are directed into the Nd:YAG rods 28 and 32 with cylindrical lenses 42 and the rods are water cooled by water jacket 44 as shown in FIG. 4.

Amplifier 24 provides a 1.3×10⁵ amplification of the input beam with good preservation of the input beam (near diffraction limited beam, less than or equal to 2XDL). Thus, the output of Amplifier 24 is a pulsed laser beam with the following characteristics:

| Pulse duration | about 100 ps |
| --- | --- |
| Energy per pulse | 80 mJ/pulse |
| Peak power per pulse | 800 MW |
| Average frequency | 12,000 pulses per second |
| Average power | 1 kW |
| Beam diameter | 9 mm |
| Brightness (power/pulse) | $2.5 \times 10^{14}$ Watts/cm² (20 µm dia. spot) |

A qualitative description of the output of the amplifier is shown in FIG. 1C. It is substantially the same as the pulse train shown in FIG. 1B except the pulses are amplified in energy by a factor of about 133,000. We then focus the beam to a 20 µm spot on the target.

Preferred sizes of the X-ray point source for proximity lithography is in the range of a few 100 µm (e.g., 500 µm) in diameter to about 1 mm in diameter. A 500 µm spot simulated from 20 µm diameter pulses is shown in FIG. 5. In order to achieve the proper spot size with the above described system, we have to hit the target at different spots (e.g., multiple 20 µm spots 52 spread over a 500 µm area 50). This is accomplished in this embodiment by mounting a mirror 38 on fast two-axis PZT 48 that steers the beam slightly over the required area as shown in FIG. 1

The above system provides very good X-ray conversion. However, a somewhat better X-ray conversion can be accomplished with higher frequency beams. In a study by Lawrence Livermore laboratories, a 15 percent conversion efficiency was observed when the laser wavelength was 532 nm (doubled 1064 nm) versus 10 percent conversion efficiency for 1064 nm. A doubling crystal (not shown) could be placed at the output beam from the amplifier in order to utilize the higher X-ray conversion efficiency at 532 nm.

SECOND PREFERRED SEED LASER

Figure 6:
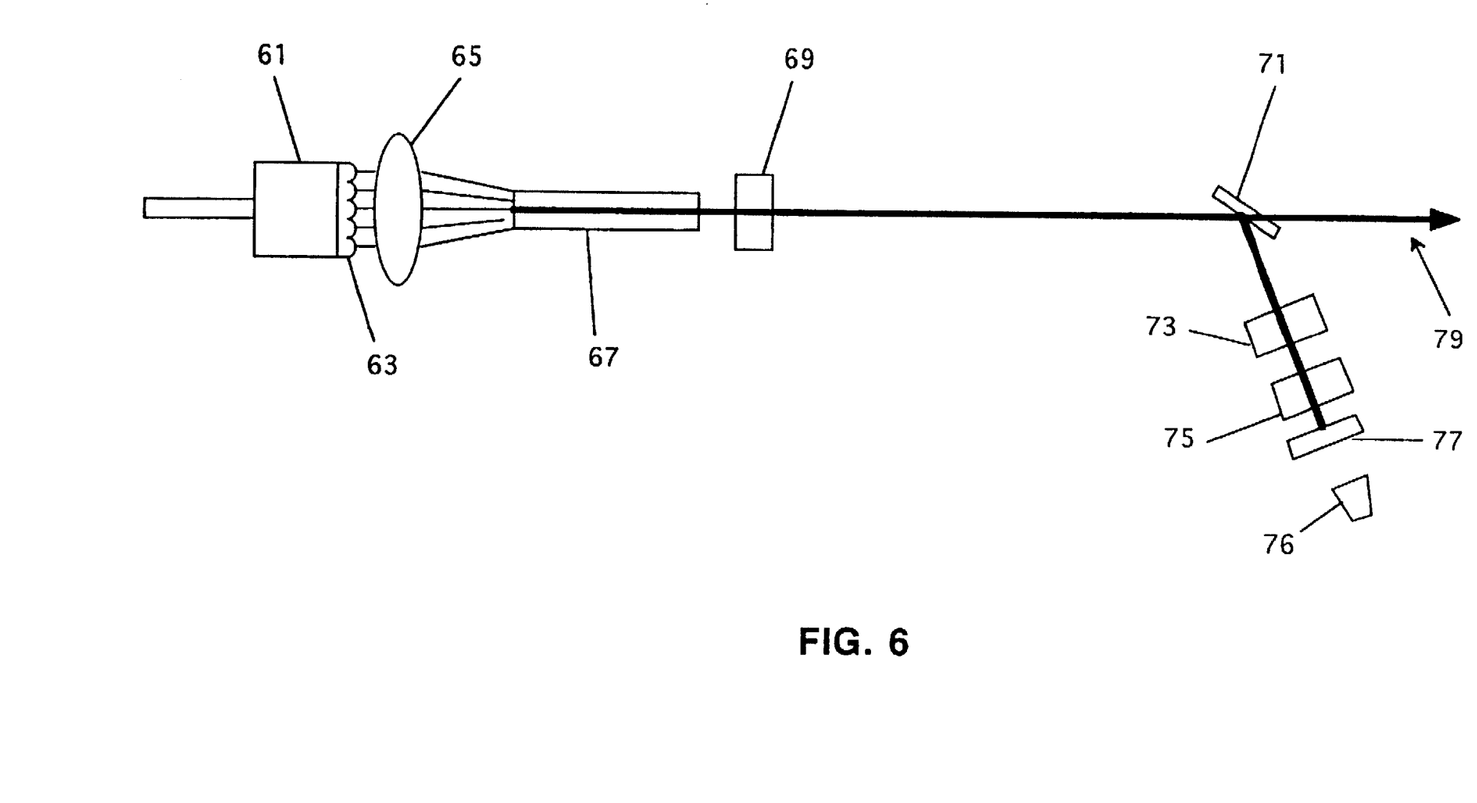
FIG. 6 is a drawing showing the details of the second preferred seed laser system.

An additional approach to the seed laser (sub nanosecond pulse duration and higher than 1000 pulses per second seed laser) can be a Q-switch mode locked configuration or a Q-switch mode locked with cavity dumping configuration (FIG. 6). Laser diode array 61 with µ-lenses 63 is focused by lens 65 for end pumping of the Nd:YAG rod 67 as described in the preferred embodiment. Polarizer beam splitter 71 reflects the laser S polarization to form a folded cavity (resonator) which includes the mode locker 75 as previously described, an acousto optics Q-switch 73, and a λ/4 electro optics Pockels cell 69 such as 1041 FV-106 and 5046 driver (Fast Pulse Technologies) for cavity dumping.

Since Q-switch 73 spoils the resonator, the gain builds up in the Nd rod as it is being pumped by the laser diode array 61. As the Q-switch opens up, the mode locked pulses build up. The laser radiation is S polarized due to the high resonator Q in the S polarization, and is trapped in the resonator between the high reflectivity mirror 77 and the high reflectivity coating on the back surface of the Nd rod 67. As the trapped mode locked pulse builds up to its maximum intensity, Pockels cell 69 turns on to give a λ/4 retardation. The mode locked pulse that propagates to the left undergoes twice λ/4 retardation which results in a P polarization after exiting the modulator to the right. Polarizer beam splitter 71 (highly transmissive to P polarization) then transmits the pulse to provide the output seed beam 79. This seed laser can be substituted for the oscillator 2 and the pulse spacing selector 20 shown in FIG. 1. The output is directed to beam expander 22 and the rest of the path of the beam is as shown in FIG. 1. Since the entire stored energy in the Nd rod is used to generate the short pulse (about 100 ps) output beam, energies in the few mJ per pulse (vs. 0.6

μJ/p as described in the first preferred seed laser) can be obtained from this configuration.

The advantage of such a system is two fold: a) typical relaxation oscillation that takes place in free running solid state lasers (large amplitude fluctuation) will not exist in the Q-switch mode, and b) the entire stored energy will convert to the desired mode locked pulses (no unused laser energy) which will result in much higher energy per pulse and therefore, lower gain or fewer passes through the amplifier will be required.

THIRD PREFERRED SEED LASER

Figure 7A:
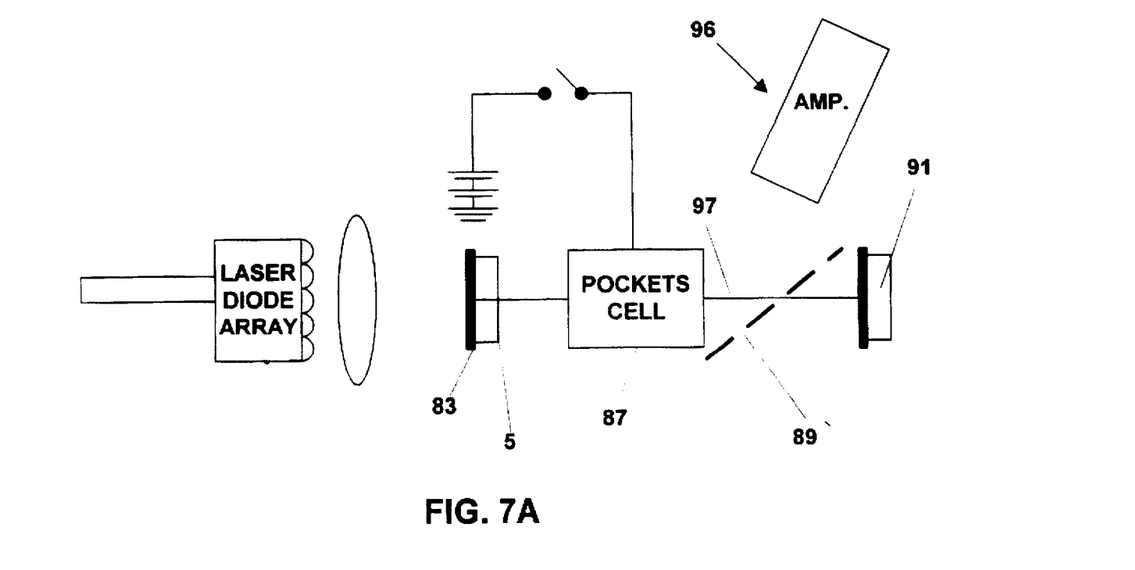
FIGS. 7A and B are drawings showing the details of the third preferred seed laser system. They show the effect of turning on a Pockels cell.
Figure 7B:
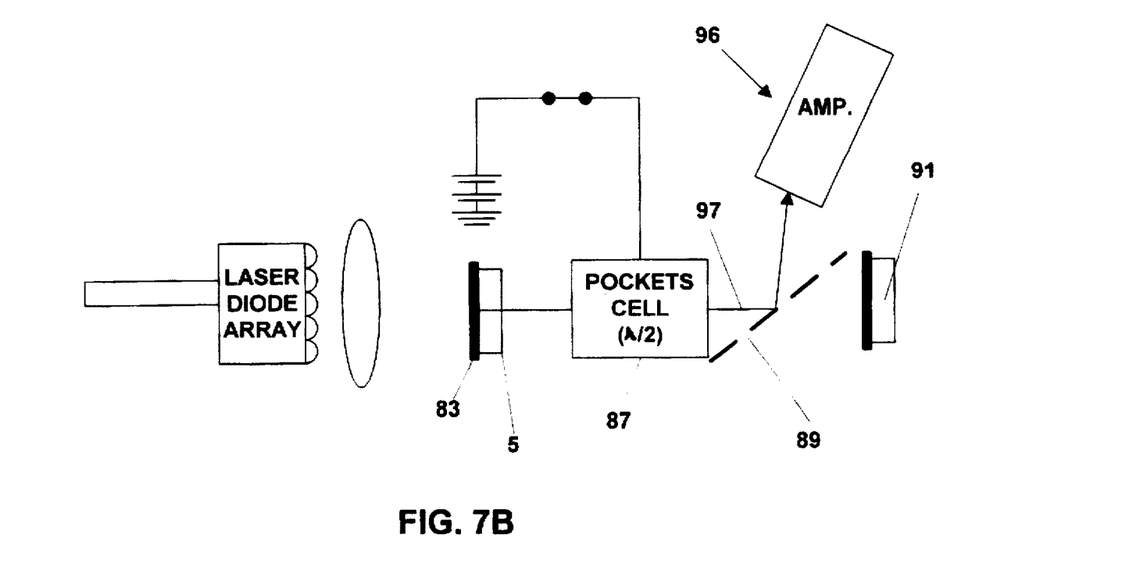

A drawing of a third preferred seed laser is shown is FIGS. 7A and B. This is a seed laser which generates a laser beam of sub nanosecond pulse duration at more than 1000 pulses per second. In this device a laser cavity is formed by high reflectivity mirror 91 and coating 83 applied to the back side of Nd:YAG crystal 5. A polarizer beam splitter 89 and a short and fast λ/2 Pockels cell 87 allow for cavity dumping. The oscillating beam 97 shown in FIG. 7A is P polarized in the plane of the paper due to the orientation of polarizer 89. When high voltage is applied to Pockels cell 87, the cell will rotate the polarization of the beam to the left by 90 degrees (perpendicular to the plane of the paper). Whenever this happens, the polarizing beam splitter 89 will reflect the perpendicular polarization as shown in FIG. 7B. The result is that a pulse, equal in length of twice the distance L (between the Pockels cell 87 and the HR coatings 83), is directed to amplifier system 96 which can be the system shown in FIG. 1 other than oscillator 2 and pulse spacing selector 20. It is easy to achieve L's of 2 to 4 cm. T he time duration of the pulse will be:

$$t=2L/c$$

where c is the speed of light.

The pump beam can be CW or quasi CW. The repetition rate of the Pockels cell driver will determine the output pulse repetition rate and the length L will determine the pulse duration. Since the crystal length can be very small, the Pockels cell can be moved close to the coating 83 on its backside. Therefore, with L=1.5 cm, the pulse duration can be reduced to the range of about 100 ps.

MULTIPLYING PULSES

Figures 8, 8A, 8B:
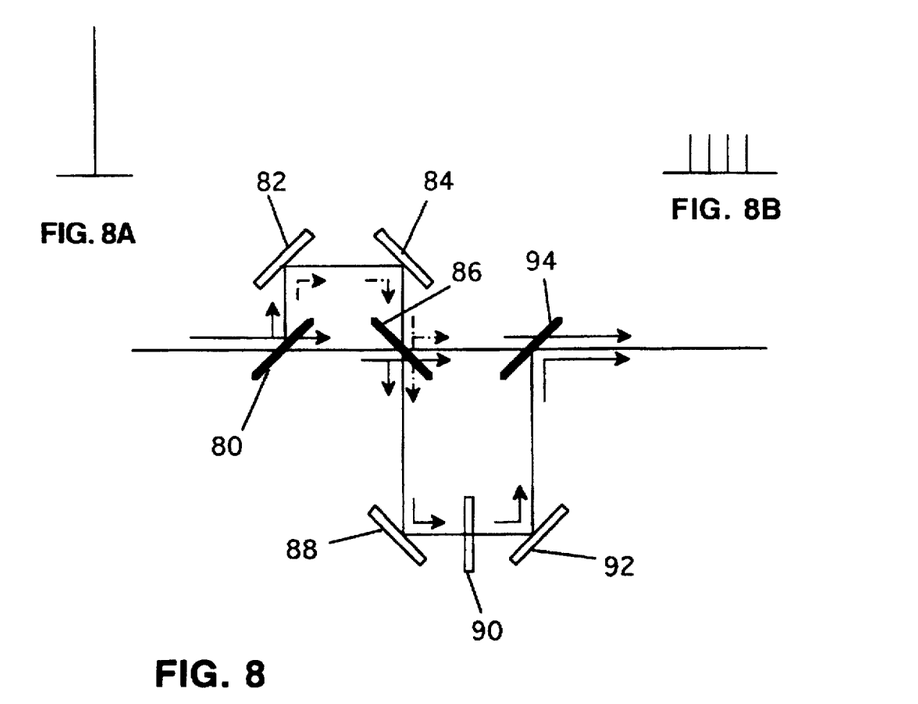
FIG. 8 is a drawing showing a set up for multiplying pulses.
FIGS. 8A and 8B are qualitative representations of the input and output pulses of the set up shown in FIG. 8.

For seed lasers that generate a single pulse at high repetition rate versus the mode locked pulse train, we may need to generate the pulse train externally in order to meet both the self focusing limit (B-integral)and the saturation fluence. This can be done using the multiplexing arrangement shown in FIG. 8. In this case each short pulse can be multiplexed into a pulse train of $2^X$ pulses (X is an integral number). A single linearly polarized pulse from the seed laser (FIG. 8A) is split into two beams by beam splitter 80, a delay (100 ps<t<10 ns) is introduced to the reflected beam. Mirrors 82 and 84 direct the delayed beam to beam splitter 86. The second delay path of 2t is formed by mirrors 88 and 92. The final delay train will have a λ/2 waveplate 90 in order to recombine all the beams in the final polarizer beam splitter 94 to form the pulse train (FIG. 8B). Additional delay paths of 4t, 8t, etc. can be added as needed to increase the number of pulses in the train.

Some systems may require that no two laser pulses hit the target at exactly the same spot (to avoid X-ray quenching or project a larger X-ray spot). This can be accomplished with a similar multiplexing set-up with a slight angular misalignment of the beams.

SECOND PREFERRED AMPLIFIER SYSTEM

FIG. 9 shows a second preferred amplifier system built by Applicants and their fellow workers. The seed laser 200 is identical to the one described as our second preferred seed laser. It generates pulses of about 1 mJ/p and about 150 ps duration. Since it is diode pumped with a 20 percent duty factor, it has the potential of operating up to about 1,000 Hz. To obtain about 250 mJ/p for efficient energy extraction from the amplifier we need an input beam on the order of about 10 mJ/p. Therefore, a preamplifier 202 (which can be identical to the amplifier described above) is needed. Beam splitters 204 split the preamplifier output to an amplifier array of seven diode pumped amplifiers in parallel.

Figure 10:
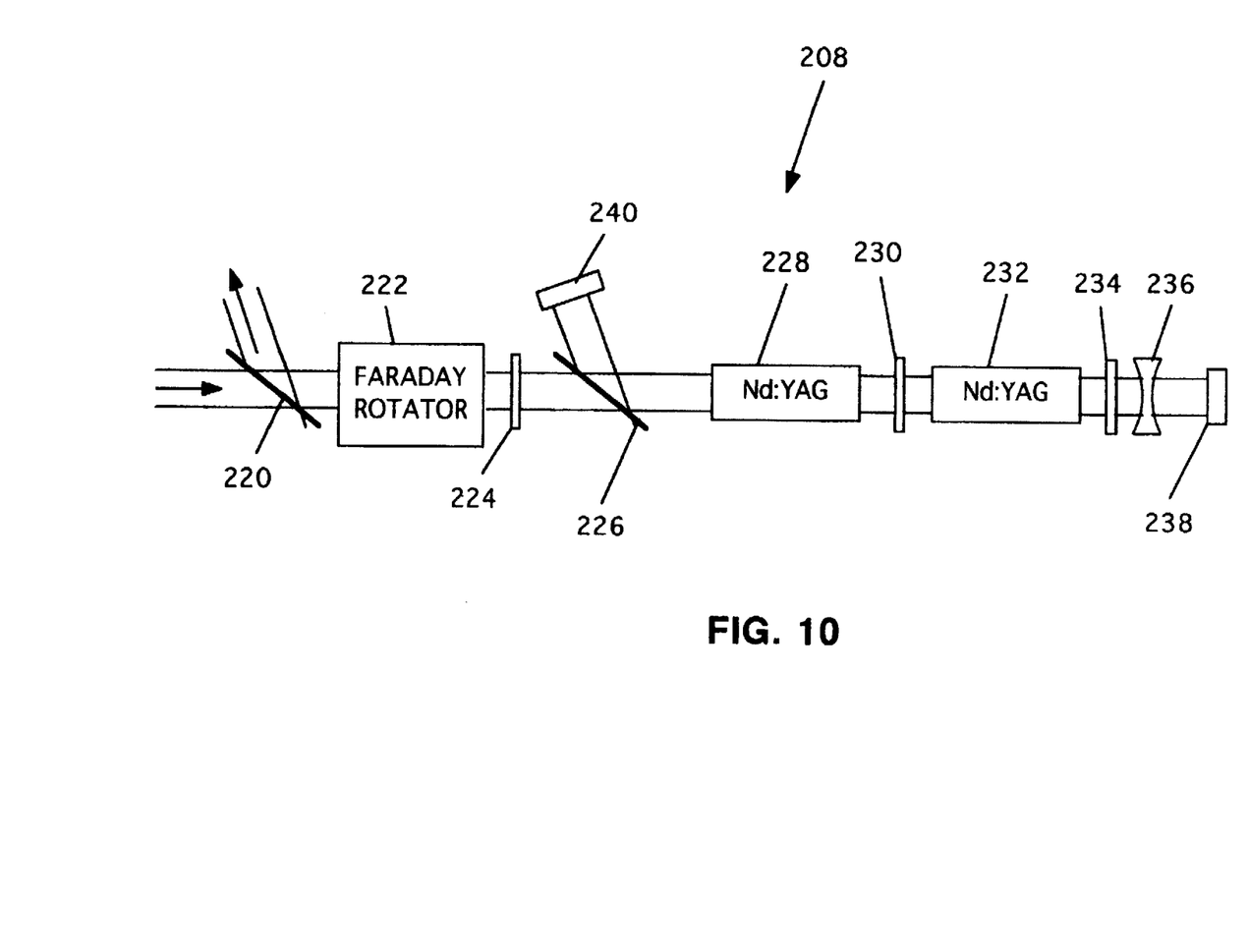
FIG. 10 is a drawing showing a four pass amplifier configuration with compensation for thermal effects.

The diode pumped amplifiers 208 built by Applicants and shown in detail in FIG. 10 is comprised of two heads for thermal compensation. Each head is pumped at about 2.5 kW of peak power. The Nd:YAG rods are 6.3 mm diameter and about 4 cm long. (A single pass amplification through the two heads is about 5.) A four pass amplifier 208 was constructed to maximize the gain and this amplifier. The horizontally polarized input beam passes through polarizer splitter (PBS) 220, undergoes a +45 degree rotation in Faraday rotator 222 and a −45 degree rotation in half waveplate 224. The horizontally polarized beam proceeds through PBS 226 to be amplified in the Nd:YAG rods with 90 degree rotation for thermal stress birefringent compensation. Negative lens 236 is used for thermal lensing compensation, and quarter waveplate 234 for 90 degree rotation for the return beam from mirror 238. The vertically polarized beam undergoes a second pass amplification in the Nd:YAG rods. The beam then reflects off PBS 226 and is reflected back by mirror 240 for third and fourth passes. The now horizontally polarized beam coming from the right passes through PBS 226, undergoes a +45 degree rotation in waveplate 224, and an additional +45 degree rotation in Faraday rotator 222. The now vertically polarized beam reflects off PBS 220 to exit the amplifier module.

The outputs from each of the seven amplifiers 208 can be doubled in a nonlinear crystal 210 to 532 and steered with a slight angle to each other in order to form an effective spot size, on target 216, comprised of a cluster of focal spots from the individual beams all as shown in FIG. 9.

Experimental results indicate that about 150 mJ/p at 532 nm is required for high x-ray conversion efficiency for proximity lithography. In addition, Applicants have demonstrated that short pulses, at about 250 mJ/p at 1064 nm (about 150 mJ/p at 532 nm) in a Nd:YAG rod about 6 mm diameter, do not cause any self focusing or any other damage to any of the optics used. Very high energy extraction from the amplifier is anticipated at this level of pulse energy.

EXPERIMENTAL RESULTS

Figure 11:
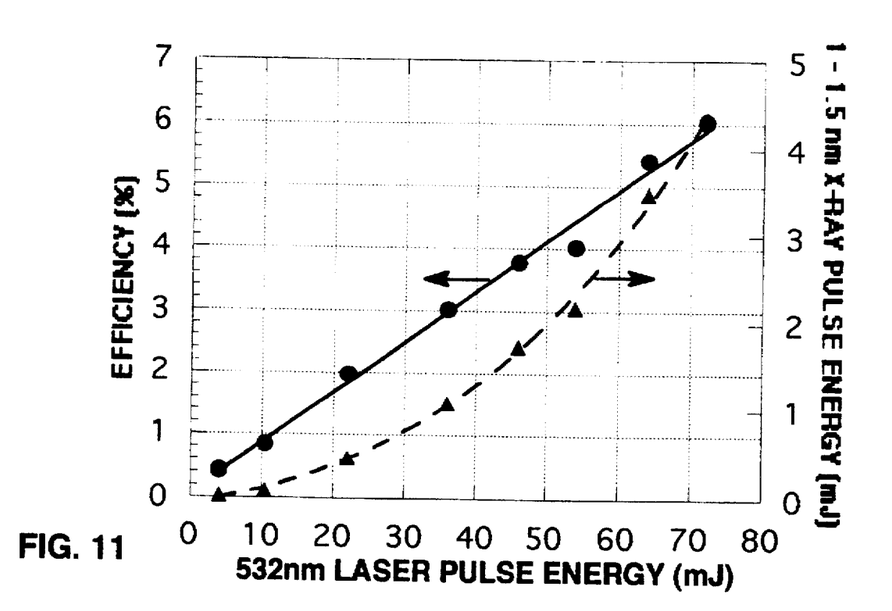
FIG. 11 is a graph showing experimental data of X-ray output and efficiency.
Figure 12:
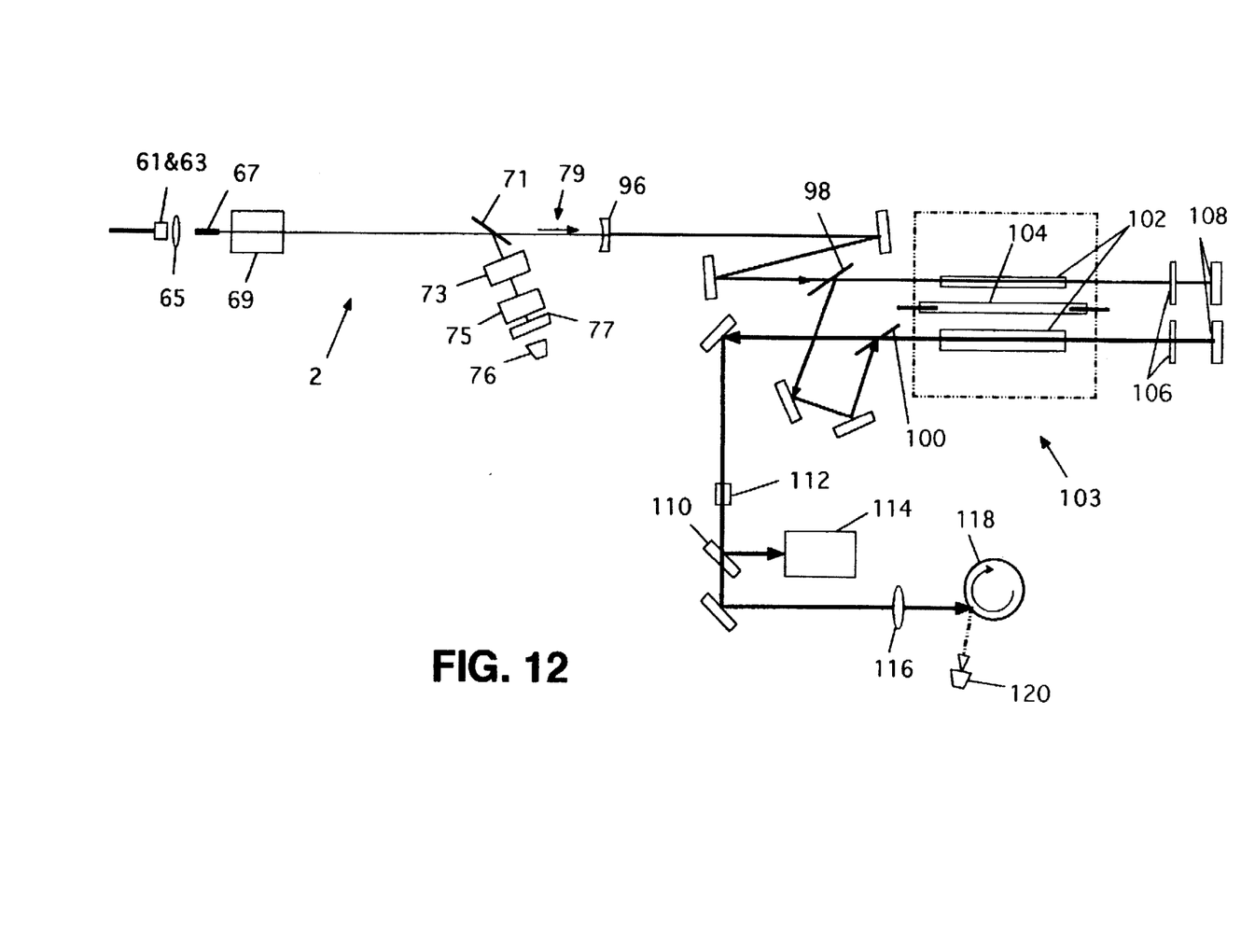
FIG. 12 is a drawing of an experimental set up built by Applicants.

To demonstrate the advantages of the present invention, we have built an experimental Nd:YAG system using the second preferred seed laser, a second harmonic generator, a four pass amplifier, and a metallic target chamber as shown in FIG. 12. The output of seed laser 2 (shown in FIG. 6 and also in block form on FIG. 12) is short pulses of about 125 ps duration. Amplifier 103 is the laser head only of a commercial Nd:YAG laser (Lumonics Inc. Model HY400). It comprises a single flash lamp 104 and two Nd:YAG rods 102. We use the laser head as a four pass amplifier. The seed beam undergoes a slight divergence by concave lens 96 to enable the seed beam to expand and fill the amplifier's aperture. Polarizer beam splitter (PBS) 98 transmits the P polarized seed beam, the beam amplified in the Nd:YAG rod then undergoes 90 degrees polarization rotation in the double pass through λ/4 waveplate 106 (mirrors 108 are highly reflective mirrors). After a second amplification pass through the Nd:YAG rod, the now S polarized beam reflects off PBS 98, the two mirrors as shown and PBS 100 for two more amplification passes through the second rod. The amplified beam is doubled to 532 nm from 1064 by a KTP nonlinear crystal 112. We obtain 55 percent conversion to the green (532). The residual 1064 nm is reflected off dichroic mirror 110 to an absorbing surface (dump) 114 while the 532 nm is transmitted through the dichroic mirror. The beam is then focused by a best form lens 116 (5 cm focal length) onto a 10 micron diameter spot on metallic target 118 which rotates by means of a stepper motor. The target is enclosed in a hermetically sealed chamber that was evacuated to vacuum and filled with helium gas to 600 torr. The X-ray output is detected by an X-ray diode 120 that was calibrated to IBM standards for X-ray lithography. The above described system is capable of operating at 10 Hz maximum due to the repetition rate limitation of the flash amplifier. The seed laser alone can exceed a repetition rate of 1 kHz. We have demonstrated X-ray (1 to 1.5 nm wavelength) conversion efficiency into $2\pi$ steradian of about 7 percent in stainless steel and about 3.5 in copper. FIG. 11 shows the experimental data from a copper target, with a promising trend toward higher efficiencies at higher pulse energies. At 1064 nm we were able to increase the energy per pulse to over 250 mJ/p without any damage to the system, and with the proper doubling, we should be able to increase the 532 nm beam to near 130 mJ/p. As indicated above with respect to the above described embodiments, future systems will have pulse rates far greater than the 10 Hz of this experimental system.

While the above description contains many specificities, the reader should not construe these as limitations on the scope of the invention, but merely as exemplifications of preferred embodiments thereof. Those skilled in the art will envision many other possible variations which are within its scope.

For example, with the first preferred seed laser, we could choose a much shorter pulse duration than 100 ps. These could be obtained using a passive saturable absorber instead of the acousto-optic mode locker. With a saturable absorber we can get femtosecond pulses. It is our belief that the advantage of pulses in the 100 ps range is that we get some heating of the plasma whereas the very very short pulses creates the plasma but provides very little heating of it. The energy per pulse needs to be in the range of 80 mJ/pulse (or more) when the objective lens is about 12 cm from the target. A distance of at least 12 cm is recommended to avoid contaminating the lens with target material. However, if this distance is reduced the required energy per pulse could be reduced accordingly because we could focus on a smaller spot. By doing so we could reduce the energy per pulse requirement from about 80 mJ/pulse to as low as about 10 mJ/pulse.

A prepulse configuration can be used to further improve the x-ray production. A first laser pulse hits the target to generate plasma and the major laser pulse then hits the same spot on the target a short time thereafter to further heat the plasma for efficient x-ray generation.

The cost of laser diodes for pumping solid state lasers is primarily dominated by the peak power requirements and this determines the number of diode bars. By operating the bars at a relatively high duty factor of 20 percent and generating a large number of pulses per second, we can minimize the initial cost of the diode pumping system. For example, a 1 kW system may require 3 kW average power from the pump diodes, a 20 percent duty factor diode array system would require 15 kW peak power. Using 50 Watt peak bars at $700 per bar, the system would cost $210,000. In comparison, a 1 percent duty factor system would require 300 kW peak power. The cost would be $4,000,000. Increasing the duty factor above 20 percent, all the way to CW is feasible, but, balancing all factors (including system lifetime and complexity), we prefer a duty factor of about 20 percent. Persons skilled in the art will recognize that a flash lamp pumping system could replace the diode pumping system.

The solid state material can be a host of materials other than Nd:YAG. For example, Nd:YLF, Cr:LiSAF, Ti:S, etc could be used. Amplification needed to boost the seed beam to the mJ/pulse level can be satisfied by either high gain or multiple passes. Up to eight passes can be achieved with passive components and much higher number of passes can be achieved in a regenerative amplifier. The steering mirror can be any reflecting element that would would be appropriate to generate the cluster of spot sizes desired, such as the 20 μm spots.

The first preferred seed beam pulse train frequency could be in the range of 10 MHz to 200 MHz or greater. With some compromise in the average power the number of pulses per second could be reduced down to about 1,000 Hz.

The amplifier can be of slab or rod design. The solid state material can be of a host material other than Nd:YAG. For example, Nd:YLF, Cr:LiSAF, Ti:S, etc. could be used. Amplification needed to boost the seed beam to the mJ/pulse level can be satisfied by either high gain or multiple passes. Up to eight passes can be done with passive components and much higher number of passes can be done in a regenerative amplifier. The steering mirror in the amplifier can be any reflecting element that would be appropriate to generate the cluster of spot sizes desired, such as the 20 μm spots.

With respect to the first preferred embodiment, other devices could be substituted for the electro-optic modulator for pulse spacing, such as cavity dumping or even an optical rotary interrupter. The pulse spacing devices would in most applications remove a very large percentage of the pulses in the first preferred seed beam such as more than 99 percent as in the preferred embodiment described; however, We could imagine applications where as the percentage remove might be as low as 80 percent. In addition to the low debris generation in a picosecond pulse system, it is also possible to have the target chamber in atmospheric helium without breakdown of the helium (the breakdown is a strong function of the pulse duration), which simplifies the X-ray transmission window to the outside world, and further reduces contamination by the debris off the target.

In addition to X-ray lithography there are several other potential applications for the system described in this disclosure such as X-ray microscopy, biological / radio biological, micro electromechanical system fabrication, bright X-ray source to replace conventional electro-bombardment sources, cell and DNA X-ray crystallography, X-ray fluorescence for material contamination detection, laser ablation technology and more.

Accordingly the reader is requested to determine the scope of the invention by the appended claims and their legal equivalents, and not by the given examples.

We claim:

1. A high average power, high brightness solid state pulse laser system comprising:
   a) a seed laser subsystem means for producing a first pulse laser beam with a pulse frequency in excess of 1,000 pulses per second each pulse having a duration of less than 1 ns, b) a laser amplifier means for amplifying said first pulse laser beam to produce an amplified pulse laser beam comprising high frequency pulses, said amplified pulse laser beam having an average power in excess of 10 Watts.

c) a focusing means for focusing said amplified pulse laser beam to a small spot size on a target, said spot size being small enough to produce a brightness level in excess of $10^{11}$ W/cm².

2. A pulse laser system as in claim 1 and further comprising a beam steering means for rapidly steering said amplified pulse laser beam relative to said target so as to simulate a spot size larger than said small spot.

3. A pulse laser system as in claim 1 wherein said beam steering means comprises a means for moving said target relative to said amplified pulse laser beam.

4. A pulse laser system as in claim 1 wherein said laser amplifier means comprises a multiple-pass Nd:YAG laser amplifier pumped by a pumping means.

5. A pulse laser device as in claim 4 wherein said pumping means comprises a plurality of laser diode arrays.

6. A pulse laser system as in claim 4 wherein said pumping means comprises a flash lamp.

7. A pulse laser system as in claim 1 wherein said laser amplifier means comprises a Nd:YAG polished rod pumped by a plurality of laser diode arrays.

8. A pulse laser system as in claim 7 wherein said laser diode arrays are programmed to operate CW.

9. A pulse laser system as in claim 7 wherein said plurality of laser diode arrays are programmed to operate at a duty factor of less than 100 percent.

10. A pulse laser system as in claim 9 wherein said duty factor is about 20 percent.

11. A pulse laser system as in claim 10 wherein said amplified pulse laser beam comprises a series of periodically spaced high frequency pulses.

12. A pulse laser system as in claim 1, and further comprising a target for the production of X-rays upon illumination at said small spots.

13. A pulse laser system as in claim 12 wherein said target is comprised of a metal.

14. A pulse laser system as in claim 13 wherein said metals is chosen from a group comprised of copper and iron.

15. A pulse laser system as in claim 1 wherein said seed laser subsystem defines a resonator and comprises a mode locked laser comprising a Q switch.

16. A pulse laser system as in claim 15 wherein said Q switch is a high gain Q switch having a gain in excess of 10 per pass and said resonator is a short resonator shorter than 4 inches.

17. A pulse laser system as in claim 15 wherein said seed laser subsystem further comprises a cavity dumper.

18. A pulse laser system as in claim 1 wherein said seed laser subsystem comprises a laser crystal having a reflective side, a λ/2 Pockels cell and a polarizer beam splitter and defines a length L being the distance between said reflective side and said pockels cell.

19. A pulse laser system as in claim 18 wherein said length L is no greater than 4 cm.

20. A pulse laser system as in claim 19 wherein said length L is no greater than 2 cm.

21. A pulse laser system as in claim 1 wherein said laser amplifier defines an operating wavelength and said seed laser subsystem comprises a laser diode producing a pulsed laser beam having a wavelength matched to the operating wavelength of said laser amplifier.

22. A pulse laser system as in claim 1 and further comprising a frequency increasing means placed in the amplified beam for increasing the frequency of the amplified beam.

23. A pulse laser system as in claim 1 wherein said seed laser subsystem comprises a solid state crystal, mode locker, a Q-switch, a fast electro-optic retarder, and a polarizing beam splitter.

24. A pulse laser system as in claim 23 wherein said fast electro-optic retarder is a Pockels cell.

25. A pulse laser system as in claim 23 wherein said seed laser subsystem means comprises a diode pumped solid state laser.

26. A pulse laser system as in claim 1 wherein said seed laser subsystem means comprises a solid state sub nanosecond pulse laser and a pulse train multiplexer.

27. A pulse laser system as in claim 26 wherein said pulse laser is a Nd:YAG laser.

28. A high average power, high brightness solid state pulse laser system comprising:

a) a mode locked Nd:YAG laser oscillator for producing a first pulse laser beam with a high pulse frequency, b) a pulse spacing selector means for removing from said first pulse laser beam more than 80 percent of the pulses in said in said beam to produce a second pulse laser beam comprising a series of periodically spaced high frequency pulses in excess of 1,000 pulses per second, c) a multiple-pass, diode pumped, Nd:YAG laser amplifier means for amplifying said expanded pulse laser beam to produce an amplified pulse laser beam with an average power in the range of about 1 kW, said beam comprising high frequency pulses, e) a focusing means for focusing said amplified pulse laser beam to a small spot size on a target, said spot size being small enough to produce a brightness level in excess of $10^{11}$ W/cm2.

29. A pulse laser system as in claim 28 and further comprising a beam steering means for rapidly steering said amplified pulse laser beam relative to said target so as to simulate a spot size larger than said small spot.

30. A pulse laser system as in claim 29 wherein said frequency increasing means is a harmonic generator.

31. A pulse laser system as in claim 28 and further comprising a beam steering means for rapidly steering said amplified pulse laser beam relative to said target so as to simulate a spot size larger than said small spot.

32. A high average power, high brightness solid state pulse laser system comprising:

a) a mode locked Nd:YAG laser oscillator for producing a first pulse laser beam with a high pulse frequency, b) a pulse spacing selector means for removing from said first pulse beam more than 80 percent of the pulses in said beam to produce a second pulse laser beam comprising a series of periodically spaced high frequency pulses in excess of 1,000 pulses per second, c) a multi-pass, diode pumped, Nd:YAG laser amplifier means for amplifying said expanded pulse laser beam to produce an amplified pulse laser beam with an average power in the range of about 1 kW, said beam comprising high frequency pulses, e) a focusing means for focusing said amplified pulse laser beam to a small spot size on a target, said spot size being small enough to produce a brightness level in excess of $10^{11}$ W/cm².

33. A high average power, high brightness solid state pulse laser system comprising:

a) a seed laser subsystem means for producing a first pulse laser beam having a frequency of more than 500 Hz and less than 5000 Hz with pulses having a duration of less than 1 ns, b) a beam divider means for dividing said first pulse laser beam into a plurality of divided pulse laser beams, c) a plurality of laser amplifiers arranged in parallel for amplifying each of said plurality of divided pulse laser beams to produce a plurality of amplified pulse laser beams, d) a focusing means for focusing said plurality of amplified pulse laser beams into a cluster of small spots on an X-ray generating target in order to produce an X-ray source.

34. A pulse laser system as in claim 33 wherein said seed laser subsystem means comprises a pulse laser preamplifier fro amplifying a pulse laser beam to produce said first pulse laser beam.

* * * * *

UNITED STATES PATENT AND TRADEMARK OFFICE
CERTIFICATE OF CORRECTION

PATENT NO. : 5,790,574

DATED : August 4, 1998

INVENTOR(S) :
Harry Rieger, Henry Shields, and Richard M. Foster

It is certified that error appears in the above-identified patent and that said Letters Patent is hereby corrected as shown below:

On the title page, change the assignee name from "IMAR Technology Co., San Diego, Calif."

to --JMAR Technology Co., San Diego, Calif.--.

On the title page, change the terminal disclaimer notice from "The term of this patent shall not extend beyond the expiration date of Pat. No. 5,934,875."

to --The term of this patent shall not extend beyond the expiration date of Pat. No. 5,434,875.--

Signed and Sealed this

Thirty-first Day of August, 1999

Attest:

Q. TODD DICKINSON

*Attesting Officer*   *Acting Commissioner of Patents and Trademarks*